Figure 1:
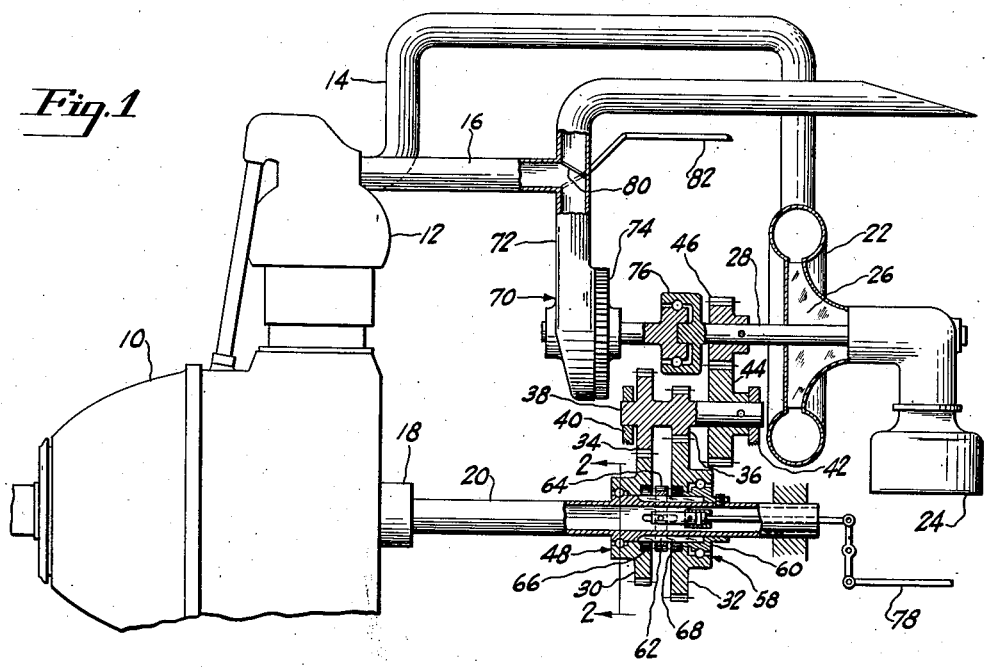

April 16, 1940.                    D. S. HERSEY                    2,197,179
                              TWO-SPEED SUPERCHARGER
                                Filed Feb. 3, 1939

INVENTOR
Donald S. Hersey
BY
Harri G. Luther
ATTORNEY

Patented Apr. 16, 1940

2,197,179

UNITED STATES PATENT OFFICE 2,197,179

TWO-SPEED SUPERCHARGER

Donald S. Hersey, West Hartford, Conn., assignor to United Aircraft Corporation, East Hartford, Conn., a corporation of Delaware Application February 3, 1939, Serial No. 254,405

9 Claims. (Cl. 60—13)

This invention relates to improvements in internal combustion engines and has particular reference to improved means for facilitating the synchronizing of gear drives for engine accessories.

An object of the invention resides in the provision of a gear synchronizing means operated by energy ordinarily wasted by the engine.

A further object resides in the provision of a simplified and very light mechanism for synchronizing engine driven gears which does not absorb engine power useful for other purposes.

A still further object resides in the provision of an engine exhaust driven turbine operatively connected to an engine driven accessory to drive the accessory independently of or in assistance to engine power or to add its power to that of the engine, for selected intervals.

A more specific object resides in the provision of an exhaust gas turbine of light weight and simple construction arranged to synchronize multiple ratio engine driven gears during gear ratio changing operations.

Other objects and advantages will be more particularly pointed out hereinafter or will become apparent as the description proceeds.

In the accompanying drawing in which like reference numerals are used to designate similar parts throughout, there is illustrated, in somewhat schematic form, a suitable mechanical arrangement constructed according to the invention. The drawing, however, is for the purpose of illustration only and is not to be taken as limiting or restricting the scope of the invention as set forth in the appended claims.

Figure 2:
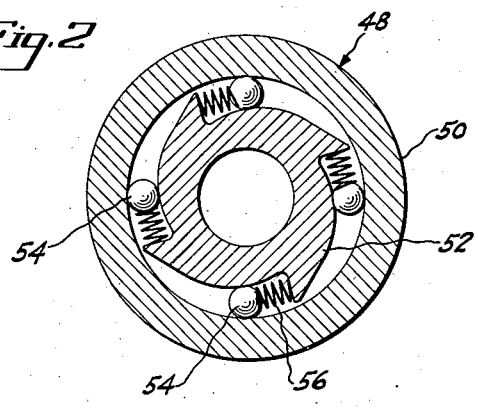

In the drawing, Fig. 1 is a somewhat schematic view of an engine and engine accessory drive with an exhaust gas turbine for synchronizing the multiple ratio gear drive applied thereto, and Fig. 2 is a sectional view on an enlarged scale taken on the line 2—2 of Fig. 1.

Referring to the drawing in detail, the numeral 10 generally indicates an internal combustion engine having a cylinder 12 provided with intake and exhaust conduits 14 and 16, respectively, and a crankshaft 18 from which extends an accessory drive shaft 20.

The end of the intake manifold 14 opposite the cylinder 12 is connected with a blower or supercharger 22, the intake of which leads from the carburetor 24. In the schematic drawing only one engine cylinder and intake manifold is shown but it is to be understood that there may be a plurality of cylinders connected with the supercharger 22 by individual intake manifolds or by such other means as may be found convenient or desirable.

Within the supercharger 22 there is a rotatable impeller 26 mounted on an impeller drive shaft 28 drivingly connected with the accessory drive shaft 20 through a system of gears by means of which the impeller may be driven at different speed ratios proportional to the speed of the drive shaft 20. In the form illustrated, the gear system is capable of driving the impeller at two different ratios with respect to the speed of the accessory drive shaft 20.

The accessory drive shaft 20 carries two gears 30 and 32, which mesh with two corresponding gears 34 and 36 on a lay shaft 38 rotatably supported in bearings 40 and 42. The lay shaft carries a third gear 44 which meshes with a gear 46 on the impeller shaft 28. The drive from the drive shaft 20 to the impeller shaft 28 may be either through the gear train comprising the gears 30, 34, 44 and 46, providing a low speed drive for the impeller shaft, or through the gear train comprising the gears 32, 36, 44 and 46, providing a high speed drive for the impeller shaft. The gear 30 is mounted for free rotation on the drive shaft 20 in one direction but is restrained against rotation relative to the drive shaft in the opposite direction by a one-way clutch 48 particularly illustrated in Fig. 2. This clutch may conveniently comprise an annular member 50 integral with or rigidly attached to the gear 30, a cam member 52 integral with or rigidly attached to the drive shaft 20, a plurality of balls or rollers 54 between the cam member 52 and the annular member 50 operative to drivingly connect the drive shaft with the gear when the drive shaft tends to rotate at a speed greater than the speed of free rotation of the gear, and to permit the gear to overrun the drive shaft when the gear tends to rotate at a speed in excess of the rotational speed of the drive shaft in the same direction; and a plurality of springs 56 for urging the members 54 into wedging relation between the cams 52 and the annular member 50.

The gear 32 is connected with the drive shaft 20 by a one-way clutch 58 similar to the clutch 48 except that it operates in the opposite direction of rotation and the cam member of the clutch 58 constitutes a portion of a bearing sleeve 60 for the gear 32. A splined portion 62 is provided on the shaft 20 between the gears 30 and 32 and beneath the bearing sleeve 60 and a dog clutch member 64 is slidable on this splined portion to engage in internally toothed recesses 66 and 68 in the respective gears 30 and 32 to selectively lock the gears to the drive shaft.

A small exhaust gas driven turbine 70 is connected with the exhaust conduit 16 by a lead 72 and has its rotor 74 operatively connected with the impeller shaft 28 by a one-way clutch 76 which may be similar in general construction to the clutch shown in section in Fig. 2. As the turbine 70, when used only for synchronizing, is needed for only occasional short intervals it may be made of a very light and simple construction and may be entirely devoid of cooling facilities as its period of operation will not ordinarily last more than a few seconds.

When the engine is operating and the dog clutch 64 is in the neutral position shown in Fig. 1, the supercharger drive will be from the shaft 20 through the one-way clutch 48, the gear 30, the gear 34, the lay shaft 38 and gears 44 and 46 to the impeller shaft 28 providing a low speed drive to the impeller. This will be a one-way drive through the overrunning clutch 48. If desired the clutch member 64 may be shifted over into engagement in the depression 66 to provide a two-way drive between the engine and the supercharger impeller. If it is now desired to change from the low speed to the high speed drive the clutch member 64 would be moved to the neutral position illustrated, by the manual control 78 and the valve 80 would be moved by the manual control 82 to the position shown in full lines in Fig. 1 in which position the exhaust gases are led from the exhaust conduit 16 through the exhaust gas turbine 70. Operation of the exhaust turbine will accelerate the impeller shaft 28 to a speed higher than the speed at which the impeller is driven by the engine through the high speed gear train until the one-way clutch 58, which is arranged opposite in direction to the clutch 48, acts to lock the gear 32 to the shaft 20 against relative rotation. As soon as the gear 32 becomes rotationally locked to the shaft 20 the clutch member 64 may be shifted by the manual control 78 into engagement with the teeth in the recess 68 without any clash due to relative rotation between the gear, the shaft and the clutch member. As soon as the clutch member is engaged the valve 80 may be moved to the broken line position shown in Fig. 1 to de-energize the exhaust turbine 70 upon which event the supercharger drive will be from the shaft 20 through the clutch 64, the gear 32 to the gear 36, and through the gears 44 and 46 to the impeller shaft 28 thus providing a high speed drive for the impeller. During the high speed drive the gear 30 will overrun the shaft 20 through the one-way clutch 48.

In changing back from the high speed to the low speed drive the exhaust turbine 70 will again be energized by suitable operation of the valve 80 to drive the supercharger at a speed at which the load is taken off of the clutch 64. As soon as the load on the clutch is relieved the clutch may be moved to the neutral position illustrated by the manual control 78. If the exhaust driven turbine is then de-energized the impeller will slow down until the drive is picked up by the gear 30 driven through the one-way clutch 48. As soon as the one-way clutch 48 acts to lock the gear 30 to the shaft 20 against relative rotation the clutch member 64 may be moved into engagement in the recess 60 to provide a two-way low speed drive. During low speed drive the shaft 20 overruns the gear 32 through the one-way clutch 58.

There are generally certain engine operating conditions in which the power supplied by an efficient exhaust gas turbine would be more than sufficient to drive the supercharger impeller. If desired, the impeller 70 could be made somewhat larger and more efficient than is required merely for synchronizing the gears and could be provided with suitable cooling means to enable it to operate for a longer period and could then be utilized to return a certain amount of the exhaust gas energy back to the engine. With the clutch member 64 in the neutral position the exhaust gas turbine described immediately above would drive the supercharger and the supercharger drive would be shared by the exhaust gas turbine and the engine in proportion to the power developed by the exhaust gas turbine under different engine operating conditions. That is, at high power engine operation the exhaust gas turbine would be able to drive the supercharger at a speed somewhat in excess of intake pressure requirements while at low power engine operation the exhaust gas turbine would not have sufficient power to drive the supercharger at a speed consistent with intake manifold pressure requirements and some power would have to be supplied by the engine. If desired, rather than permitting the exhaust gas turbine to overdrive the supercharger at high engine power operation, the clutch 64 could be engaged with the gear 30 to return the excess power back to the engine.

While an illustrative arrangement has been somewhat diagrammatically shown in the accompanying drawing and hereinabove described for the purpose of disclosing the invention, it is to be understood that the invention is not limited to the particular arrangement so illustrated and described but that such changes in the size, shape and arrangement of the various parts may be resorted to as come within the scope of the subjoined claims.

Having now described the invention so that others skilled in the art may clearly understand the same, what it is desired to secure by Letters Patent is as follows:

1. In combination with an engine and a supercharger therefor, a change speed gear system between said engine and said supercharger comprising a plurality of gear trains providing different gear ratios for driving said supercharger from said engine, manual means for selecting any one of said gear ratios by rendering the corresponding gear train operative and the remaining gear trains inoperative, an exhaust driven turbine connected to said supercharger by a one-way drive, and means for controlling said turbine to bring the speed of said supercharger up to the speed at which said supercharger is to be driven by the higher ratio gear train when said gear drive is being changed from a lower to a higher speed gear train.

2. The construction as set forth in claim 1 in which a one-way driving clutch is provided between each gear train and the engine.

3. In combination with an engine and a supercharger therefor, a gear drive between said engine and said supercharger comprising two gear trains providing a high speed and a low speed driving connection between said engine and said supercharger, manually operable means for shifting the driving connection from one to the other of said gear trains, an engine exhaust driven turbine operative to drive said supercharger at a speed above the speed at which it is driven by said high speed gear train, a one-way driving connection between said turbine and said supercharger, and means for controlling said turbine to bring the speed of said supercharger up to the driving speed of said high speed gear train whenever the supercharger drive is shifted from said low speed to said high speed gear train.

4. The arrangement as set forth in claim 3 in which a one-way drive is included in said low speed gear train to permit said gear train to overrun when the drive is through said high speed gear train and said high speed gear train includes a releasable positive drive clutch and a one-way clutch arranged in a direction opposite to that of the one-way clutch in said low speed gear train to lock two relatively rotatable elements of said high speed gear train against relative rotation when the speed of said supercharger is brought up by said turbine to the driving speed of said high speed gear train to permit the connection of said positive drive clutch between said relatively rotatable elements.

5. The arrangement as set forth in claim 3 including a one-way drive clutch in said low speed gear train, a one-way drive clutch in said high speed gear train arranged to act in a direction opposite to the one-way clutch in said low speed gear train, and a manually controllable positive clutch selectively associable with either of said gear trains.

6. In combination with a change speed drive including a driving element, a driven element, a plurality of different speed ratio gear trains between said driving element and said driven element, and means for changing the drive between said driving element and said driven element from one of said gear trains to another, a second driving element capable of driving said driven element at a speed above the speed at which it is driven by the lower speed ratio gear train, and means for rendering said second driving element operative to drive said driven element while the gear drive is being changed from a lower to a higher speed ratio gear train to bring the speed of said driven element up to synchronism with said higher speed ratio gear train.

7. In combination with a change speed transmission including a driving element, a driven element, a plurality of different speed ratio gear trains between said driving element and said driven element, and means for changing the drive between said driving element and said driven element from one of said gear trains to another, a second driving element independent of said first mentioned driving element and capable of driving said driven element at a speed as high as the speed at which said driven element is driven by the highest speed ratio gear train, and means for rendering said second driving element operative to drive said driven element while the gear drive is being changed from a lower to a higher speed ratio gear train to bring the speed of said driven element up to synchronism with said higher speed ratio gear train.

8. In combination with an element to be driven, a main source of power and an auxiliary source of power, a driving connection between said main source of power and said element comprising means providing a plurality of speed ratios and means for selecting the desired speed ratio, said selecting means comprising means for connecting two relatively movable members in the selected speed ratio means, a driving connection between said auxiliary source of power and said element for transmitting power from said auxiliary source of said element and to at least a portion of the connection between said main source of power and said element and effective to drive one of said two relatively movable members of said selected speed ratio means at substantially the same speed that the other is being driven and means for moving said connecting means into position to connect said two relatively movable members while they are being rotated at substantially the same speed.

9. In combination with an element to be driven, two sources of power for driving said element, a connection between one of said sources and said element comprising a one way clutch arranged to transmit power from said source to said element but not in the reverse direction, and a connection between the other source of power and said element comprising a change gear system having a plurality of gear trains providing different gear ratios, a one way clutch between one gear train and said other source of power arranged to transmit power from said other source of power to said gear train but not in the reverse direction, and another one way clutch between another of said gear trains and said other source of power arranged to transmit power from said another gear train to said other source of power but not in the reverse direction.

DONALD S. HERSEY.